United States Patent Office 2,810,746
Patented Oct. 22, 1957

2,810,746

SULFONATION OF PROPYLENE TRIMER AND TETRAMER

Walter H. C. Rueggeberg, Atlanta, and Thomas W. Sauls, College Park, Ga., assignors to Tennessee Corporation, New York, N. Y., a corporation of New York No Drawing. Application April 8, 1955,
Serial No. 500,294

3 Claims. (Cl. 260—513)

This invention relates to the sulfonation of propylene trimer and tetramer and to the resultant sulfonated materials which together with their salts have valuable surface active properties.

Because of their surface active properties and extended use as wetting, rewetting, emulsifying, dispersing and similarly used agents in the textile as well as in numerous other industries, "sulfonated" oils have been known and manufactured for a long time. In prior patents and literature pertaining to this subject, however, the term "sulfonated" often has been erroneously applied to materials which are the addition products of sulfuric acid to an olefinic linkage or the reaction product of an alcohol with a sulfating agent such as $H_2SO_4$, oleum, $SO_3$, or $ClSO_3H$. These latter types of materials are really esters of sulfuric acid, i. e., they are sulfates rather than sulfonates, the latter term being properly applied only to those materials containing a direct carbon to sulfur linkage. These two types of materials can be represented by the following formulae:

(1) 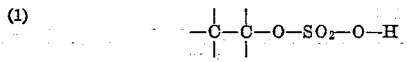

A sulfate, or alkyl sulfuric acid (2) 

A sulfonate.

The alkyl sulfuric acids, or sulfates, are soluble in water, and if the hydrocarbon part of the molecule is sufficiently large ($C_8$ to $C_{20}$), exhibit surface activity. For example, treatment of olefinic bodies with sulfuric acid forms addition products of $H_2SO_4$ at the olefinic linkage, as in the case of sulfated esters of unsaturated fatty acids such as propyl oleate.

(3) 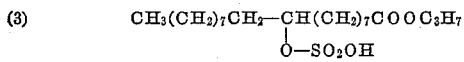

Such sulfates are usually used as salts, most frequently as sodium salts. In many cases, however, such sulfates or their salts are undesirable because of their instability toward hydrolysis and heat. If such an ester of sulfuric acid is permitted to stand in water under acidic conditions, decomposition takes place yielding an inorganic sulfate and an alkanol, the decomposition being accelerated by heat:

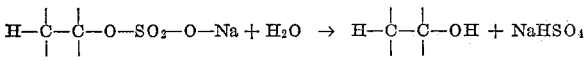

These decompositions often become troublesome when sulfated materials have to be stored in considerable quantities before shipment or use. Furthermore, when sulfuric acid or oleum is used as a sulfating agent for olefins, an excess of the sulfating agent is required to obtain practical yields of the sulfated product in most instances. When neutralized, this excess becomes sodium sulfate which is undesirable in many cases, but it is difficult and costly to remove either the excess sulfuric acid from the unneutralized sulfated product or the $Na_2SO_4$ from the neutralized sulfated product.

A much more desirable configuration for these types of materials is that where true sulfonation exists, that is, where there exists a carbon to sulfur linkage of type (2), because hydrolysis of the sulfonic acid or its salts is impossible under nearly all conditions of acidity and basicity and over a wide temperature range. Thus it has been proposed to produce stable carbon to sulfur linkages at the double bond of unsaturated materials by means of the well known carbyl sulfate reaction. This reaction, in order to obtain a high yield, requires at least two moles of $SO_3$ per mole of unsaturated material. Carbyl sulfate formation can be expressed as follows:

(4) 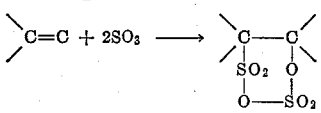

The carbyl sulfate can then be hydrolyzed to give a sulfonic-acid sulfuric acid ester as follows:

(5) 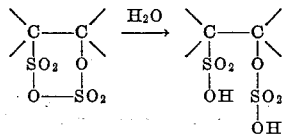

Under more vigorous conditions the sulfonate-sulfate grouping can be further hydrolyzed to a hydroxy-sulfonic acid as follows:

(6) 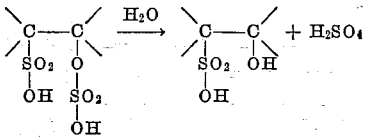

It will be seen that products of types (4), (5), and (6) each contain a carbon to sulfur linkage, but also that addition has taken place at both carbon atoms at the double bond, requiring two moles of $SO_3$, and that unsaturation has disappeared. These products and their sodium and other salts possess surface activity and wetting properties, but in general are inferior in these respects to well known and widely used sulfated oils (e. g., Twitchell oils), while their preparation is more complex and excessive amounts of sulfonating agent are required.

One of the objects of the present invention is to sulfonate olefinic bodies, particularly those described hereinafter, so as to produce sulfonic or carbon-to-sulfur linkages between one of the carbon atoms at the double bond and the sulfonic acid group —$SO_3H$, and to eliminate largely the carbyl sulfate reaction set forth above and minimize the formation of sulfuric acid esters and hydroxy sulfonates. The primary reaction taking place can be expressed as follows:

(7) 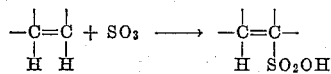

In recent years, a large number of liquid hydrocarbon raw materials have been produced cheaply by the catalytic polymerization of lower molecular weight monomers. For example, propylene prepared by high temperature dehydration of propane will polymerize under the influence of catalysts such as $H_3PO_4$ and $H_2SO_4$ to yield products containing three and four propylene units and therefore called propylene trimer and tetramer respectively. Since they contain nine and twelve carbon atoms respectively and only one double bond per molecule, they are also sometimes called nonene and dodecene, but actually they are rather complex mixtures of olefins averaging $C_9$ and $C_{12}$ respectively in their chains. Published data indicate the presence of a number of structures having a double bond and in some cases also a reactive tertiary hydrogen atom, i. e., a hydrogen atom attached to a carbon atom which in turn is attached to three other carbon atoms.

We have found that when propylene trimer and/or tetramer as described above are sulfonated by treatment with sulfur trioxide (SO₃) in liquid sulfur dioxide (SO₂) in the presence of a small amount of acetic acid catalyst, the above primary Reaction 7 is obtained. In addition to this primary reaction, SO₃H may also replace some allylic hydrogen in the position indicated in the following formula:

(8) 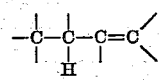

to form additional true sulfonic acid (i. e., carbon-to-sulfur) linkages. Also while the carbyl sulfate reaction described above does not take place to any material extent, some hydroxy sulfonic acids may nevertheless be formed by the reactions set forth below.

Although the exact mechanism of the primary reaction is difficult to ascertain and prove, the following theory appears to fit the facts and is believed to be correct. When SO₃ comes in contact with a carboxylic acid, the following reaction may take place at the free carboxyl group:

(9) 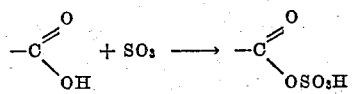

The sulfate group thus formed is very unstable and hence may decompose to give rise to the following reaction:

(10) 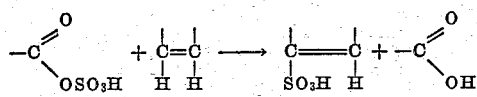

Hydroxy sulfonic acids can be formed also through the addition of the intermediate product of Formula 9 to the double bond as follows:

(11) 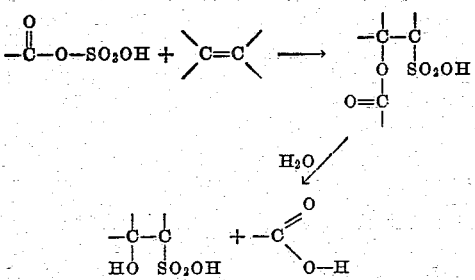

The reaction can be carried out in any desired manner. For example, propylene trimer and/or tetramer is mixed with appropriate quantities of the sulfonating agent (i. e., SO₃ dissolved in liquid SO₂) and of the carboxylic catalyst either batchwise or continuously. Good results have been obtained by supplying these reagents continuously and at equivalent rates to a spinning disk so that their films are formed and the reagents intimately mixed on the disk, and the mixture is continuously and rapidly discharged from the disk by centrifugal force. The reaction is essentially instantaneous and takes place rapidly at the temperature of liquid SO₂ under atmospheric pressure, say −10° C. Hence the use of higher temperatures and pressure equipment are unnecessary.

The amount of SO₃ should preferably be about one mole per mole olefin as a minimum in order to obtain good yields and a high degree of monosulfonation at the double bond. At this ratio of the reagents, the following typical examples indicate that the molar ratio of combined SO₃ to olefin will usually be about 1.0 and that about 80 mole percent or more of the unsaturation existing prior to sulfonation is retained, showing that the primary reaction is of type 7 set forth above with or without acetic acid catalyst. The amount of SO₃ may be increased if desired, say up to about two moles per mole of olefin, with an accompanying increase in the amount of olefin converted to sulfonated material as would be expected. It is found, however, that under the conditions of the reaction the excess SO₃ causes very little increase in carbyl sulfate formation, even in the absence of acetic acid catalyst. Instead the residual unsaturation is largely retained and there is little increase in the percentage of hydroxy sulfonate, these results indicating a considerable amount of allylic or tertiary hydrogen sulfonation.

The acetic acid is not combined in the end product but remains free and can be titrated in the sulfonic-acetic acid reaction mixture. The amount of this acetic acid catalyst should not be substantially less than 0.125 mole per mole of SO₃ used in the reaction, which appears to be about the minimum effective concentration. It will be understood that larger concentrations can be used as pointed out below. At this minimum concentration, however, acetic acid causes an increase of about 15% or more in the weight percent of olefin converted to sulfonated material, using one mole SO₃ per mole of olefin. At higher ratios of SO₃ to olefin and in the presence of excess SO₃, the extent of this increase may be reduced, as it was in the case of propylene trimer (Table III). The use of acetic acid also causes a small decrease in the amount of residual unsaturation and an accompanying increase in the amount of hydroxy-sulfonate due to reaction 11 set forth above.

In the following illustrative examples, the propylene trimer and tetramer had the following characteristics:

Propylene trimer:
- Average molecular wt__ 126.
- Sp. gr_____ 0.74 g./ml.
- Sulfur_____ 20.0 p. p. m.
- Unsaturates as C₉H₁₈__ 95 mole percent.

Propylene tetramer:
- Sp. gr_____ 46.0–49.0 ° A. P. I. at 60° F.
- Sulfur_____ 0.1 weight percent, max.
- Bromine number_____ 85–115.
- Distillation, 5% min___ 375° F.

The acetic acid used was glacial acetic acid.

The following general procedure was used:

In runs 1–3, 0.125 mole acetic acid per mole SO₃ used was mixed with the olefin before sulfonation. Runs 4–6 were made in the absence of acetic acid. For all runs the SO₃ was dissolved in 500 ml. liquid SO₂ and was added batchwise to the olefin in a 3-neck 1-liter flask with good stirring. Additions were all made in 6–8 minutes.

The SO₂ was evaporated with warm water running over the outside of the flask while stirring the contents. This evaporation time varied from 10–20 minutes. Addition of 25 ml. water was made in all cases when the temperature of the acid reached 23–25° C. Hydrolysis caused the temperature to rise to 50–65° C., depending upon the amount of SO₃ used in excess of olefin. Stripping of the SO₂ was virtually complete after 15 minutes of stirring the warm hydrolyzed acid with air sweeping through the flask over but not through the liquid contents.

Neutralizations were made by adding a 25% NaOH solution while allowing the temperature to rise at will to 80–90° C. The slightly basic (pH 9–10) solutions were then boiled gently for 1¼ hours with reflux to hydrolyze the ester groups present. Small additions of NaOH solution during this time were made since the pH was observed to drop during the hydrolysis. Final pH was left at 9–10.

After cooling and diluting with cold water to approximately 30–35% solids, the oil was extracted from the aqueous solutions with three 110 ml. portions of petroleum ether (B. P. 30–65° C.). In several instances, addition of a few ml. of methanol was found to be necessary to break the emulsions.

After boiling off the residual petroleum ether and methanol from the aqueous solutions, the total runs were bottled and weighed accurately.

The approximate conversion was found by evaporation of the combined petroleum ether extracts on a water bath. However, due to the slight volatility of the oil at this temperature and to the reluctance of the higher boiling ether fractions to be driven off, only rough conversion figures could be obtained in this manner.

Analyses and evaluations of the products, where performed, were made by the following procedures:

Percent solids:
(a) Toluene distillation method whereby a 20.0 g. sample plus 70 ml. toluene gave the measured quantity of water.
(b) Drying method whereby a 10 g. sample was weighed to 0.01 g. in an evaporating dish, left in the oven at 110° C. overnight, and weighed again. This method gave slightly lower results than (a).

Percent inorganics: Methanol precipitation method was used whereby a 10.0 g. sample was taken. 18 ml. H₂O plus 250 ml. MeOH was added with stirring. The inorganic salts were filtered off, washed with 90% MeOH, dried at 110° C. for at least 1 hour, and weighed on the tared filter paper.

Percent organic salts by difference.

Percent sodium acetate by calculation.

Mercerization test (performed on tripropylene sulfonate only): 0.6 g. active ingredient was added to 600 g. 25% NaOH solution to make 0.1% active solution. A Draves wetting test with a heavy (4.5 g.) hook at 30° C. was then performed on each sample.

Degree of residual unsaturation after sulfonation (performed on tripropylene sulfonate only): A direct titration of the extracted aqueous solutions with bromine in glacial acetic acid was used for these determinations. Approximately 1 gram of the 25–30% aqueous solutions were weighed in duplicate in ground glass stoppered bottles. After adding 15 ml. glacial acetic acid to the samples the bottles were cooled in the refrigerator just short of the freezing point of acetic acid. The samples were then titrated rapidly with 0.3 N bromine in acetic acid to the first yellow color persisting for at least 10 seconds. Samples 2, 3, 5, 6 of the tripropylene sulfonate developed a blue color upon adding the first bromine making it necessary to titrate to a green end point which was not as satisfactory as samples 1 and 4. (This same method gave 87% unsaturation as nonene when applied directly on the unsulfonated tripropylene. A small amount of HBr was observed in this analysis whereas in the analyses of the aqueous sulfonated samples no HBr was observed.)

Percent hydroxy sulfonate: The acetylation method using acetic anhydride and pyridine as described in Siggia's "Quantitative Organic Analysis via Functional Groups" (page 5) was employed. Water was removed from 10 gram aqueous samples by distilling with 40 ml. toluene in the usual water trap apparatus. After removing the water, all but 10 ml. of the toluene was then distilled off. To these dehydrated samples in toluene was added 5 ml. of acetic anhydride-pyridine mixture (10 ml. acetic anhydride plus 30 ml. pyridine). The flasks, with pyridine-moistened glass stoppers inserted, were then heated on a water bath for 45 minutes at which time 10 ml. of water was added and heating was continued for two more minutes. After cooling, the samples were then titrated with 0.5 N alcoholic NaOH to the blue color of cresol red-thymol blue indicator. Blanks containing toluene and acetic anhydride-pyridine mixture were run along with all the samples. In addition to this blank an acid-alkalinity blank on a separate dehydrated sample of sulfonate such as described above, was determined and found to be nil in all six cases.

TABLE I

Materials required for the sulfonation of tripropylene

| Run No. | SO₃ | | Olefin | | Acetic Acid | | Mole ratio, SO₃ to Olefin | NaOH | |
|---|---|---|---|---|---|---|---|---|---|
| | gms. | moles | gms. | moles | gms. | moles | | gms. | moles |
| 1 | 53.6 | 0.67 | 84.2 | 0.67 | 5 | 0.083 | 1 | 33 | 0.825 |
| 2 | 53.6 | 0.67 | 56.3 | 0.447 | 5 | 0.083 | 1.5 | 31.6 | 0.79 |
| 3 | 53.6 | 0.67 | 42.8 | 0.34 | 5 | 0.083 | 2 | 33 | 0.825 |
| 4 | 53.6 | 0.67 | 84.2 | 0.67 | | | 1 | 28.5 | 0.712 |
| 5 | 53.6 | 0.67 | 56.3 | 0.447 | | | 1.5 | 29.4 | 0.735 |
| 6 | 53.6 | 0.67 | 42.8 | 0.34 | | | 2 | 30 | 0.75 |

TABLE II

Composition and properties of aqueous sulfonated tripropylene solutions

| Run No. | Extr'd Oil (gms.) | Weight Extr'd Prod. | Percent Solids [1] | | Percent Inorg. | Gardner Color | Merceriz'g Test (seconds) | Avg.[2] ml. percent of Resid'l Unsat'n | Mole Percent Nonene Hydroxy Sulfonate |
|---|---|---|---|---|---|---|---|---|---|
| | | | (a) | (b) | | | | | |
| 1 | 26.0 | 411.0 | 32.5 | 31.9 | 4.93 | 8–9 | 9 | 78.8 | 3.9 |
| 2 | 11.5 | 358.7 | 31.2 | 30.3 | 7.72 | 10 | 9 | 72.4 | 4.9 |
| 3 | 6.5 | 343.5 | 30.0 | 29.3 | 9.3 | 13 | 13 | 68.8 | 5.8 |
| 4 | 35.5 | 423.5 | 26.7 | 26.1 | 5.33 | 9 | 9 | 83.5 | nil |
| 5 | 18.6 | 377.0 | 26.2 | 24.5 | 8.39 | 10 | 15 | 77 | 1.1 |
| 6 | 12.0 | 334.0 | 28.8 | 27.9 | 9.78 | 12 | 15 | 74.5 | 4.5 |

[1] (a) By distillation method; (b) By drying method. For details, see above.
[2] Expressed as mole percent nonene sulfonate. Molecular weight of nonene sodium sulfonate taken as 228.

TABLE III

*Summary of material balances for sulfonated tripropylene*

| Run No. | A | B | C | D | E | F | G | H | I |
|---|---|---|---|---|---|---|---|---|---|
| 1 | 133 | 20.3 | 6.8 | 105.9 | 47.0 | 58.5 | 69.5 | 10.5 | 0.97 |
| 2 | 112 | 27.6 | 6.8 | 77.6 | 32.8 | 44.8 | 79.6 | 23.6 | 0.90 |
| 3 | 103 | 32.0 | 6.8 | 64.2 | 30.1 | 34.1 | 81.5 | 22.9 | 1.08 |
| 4 | 113 | 22.6 | | 90.4 | 40.3 | 50.1 | 59.7 | 17.9 | 1.0 |
| 5 | 98.8 | 31.6 | | 67.2 | 29.8 | 37.4 | 66.3 | 23.6 | 0.97 |
| 6 | 96.2 | 32.7 | | 63.5 | 29.9 | 33.5 | 78.0 | 22.5 | 1.09 |

A. Total solids in aqueous products (gms.).
B. Inorganic salts in aqueous product (gms.).
C. Sodium acetate in aqueous product (gms.).
D. Organic salt (active ingredient by difference) in aqueous product (gms.).
E. Wt. SO₃Na group in active ingredient by NaOH balance (gms.).
F. Wt. combined olefin by difference (gms.).
G. Conversion of olefin (weight percent).
H. SO₃ lost or unaccounted for (mole percent).
I. Ratio of SO₃ to combined olefin (molar).

Column G of Table III shows that the yield of monosulfonated nonene increased in the presence of acetic acid (runs 1, 2 and 3) over those runs where acetic acid is absent (4, 5 and 6).

The amount of SO₃ unaccounted for as given in column H of Table III was undoubtedly lost to the vent. In larger operations, where closer control can be exercised, this loss would probably not occur.

The ratios of combined moles of SO₃ to moles olefin (nonene in this case) are indicative of the fact that the major sulfonation process is one of monosulfation. According to the last two columns of Table II, the degree of total monosulfonation (combined unsaturated sulfonate plus hydroxy sulfonate) is at least 70 to 80%.

TABLE IV

*Materials required for the sulfonation of tetrapropylene*

| Run No. | SO₃ gms. | SO₃ moles | Olefin gms. | Olefin moles | Acetic Acid gms. | Acetic Acid moles | Mole Ratio, SO₃ to Olefin | NaOH gms. | NaOH moles |
|---|---|---|---|---|---|---|---|---|---|
| 1 | 53.6 | 0.67 | 112.5 | 0.67 | 5 | 0.083 | 1–1 | 30.4 | 0.76 |
| 2 | 53.6 | 0.67 | 75 | 0.447 | 5 | 0.083 | 1.5–1 | 29.3 | 0.73 |
| 3 | 53.6 | 0.67 | 56.3 | 0.335 | 5 | 0.083 | 2–1 | 28.2 | 0.71 |
| 4 | 53.6 | 0.67 | 112.5 | 0.67 | | | 1–1 | 26.4 | 0.658 |
| 5 | 53.6 | 0.67 | 75 | 0.447 | | | 1.5–1 | 26.1 | 0.652 |
| 6 | 53.6 | 0.67 | 56.3 | 0.335 | | | 2–1 | 26.1 | 0.663 |

TABLE V

*Composition and properties of aqueous sulfonated tetrapropylene solutions*

| Run No. | Extract Oil | Percent Solids[1] (a) | Percent Solids[1] (b) | Percent Inorganic Salts | Gardner Color | Wetting[2] Time (sec.) |
|---|---|---|---|---|---|---|
| 1 | 46 | 33.8 | 33.8 | 5.15 | 12 | 13 |
| 2 | 25.5 | 32.8 | 33.2 | 7.12 | 12 | 13 |
| 3 | 16.5 | 32.5 | 31.3 | 8.75 | 12½ | 18 |
| 4 | 62.0 | 28.8 | 28.2 | 5.36 | 11 | 32 |
| 5 | 30.0 | 30.0 | 29.1 | 7.41 | 12 | 13 |
| 6 | 22.5 | 31.0 | 32.5 | 10.7 | 14 | 19 |

[1] (a) By distillation method; (b) By drying method. For details, see above.
[2] Approximately 0.1% active ingredient in distilled water.

TABLE VI

*Summary of material balances for sulfonated tetrapropylene*

| Run No. | A | B | C | D | E | F | G | H | I |
|---|---|---|---|---|---|---|---|---|---|
| 1 | 128 | 17.4 | 6.8 | 103.8 | 44.3 | 59.5 | 52.8 | 17.3 | 1.2 |
| 2 | 113 | 24.2 | 6.8 | 82.0 | 31.9 | 50.1 | 66.6 | 28.3 | 1.04 |
| 3 | 101 | 28.3 | 6.8 | 65.9 | 23.0 | 42.9 | 76.2 | 36.8 | 0.88 |
| 4 | 110.5 | 20.5 | | 90.0 | 38.0 | 52.0 | 46.3 | 23.5 | 1.19 |
| 5 | 100.5 | 25.6 | | 74.9 | 29.3 | 45.6 | 60.8 | 30.0 | 1.05 |
| 6 | 88.6 | 29.9 | | 58.7 | 24.8 | 33.9 | 60.0 | 32.5 | 1.19 |

A. Total solids in aqueous product (gms.).
B. Inorganic salts in aqueous product (gms.).
C. Sodium acetate in aqueous product (gms.).
D. Organic salt (active ingredient by difference) in aqueous product (gms.).
E. Wt. SO₃Na group in active ingredient by NaOH balance (gms.)
F. Wt. combined olefin by difference (gms.).
G. Conversion of olefin (weight percent).
H. SO₃ lost or unaccounted for (mole percent).
I. Ratio of SO₃ to combined olefin (molar).

In addition to the evaluations given in the tables, above, a few miscellaneous evaluations were made as follows to show the effectiveness of sodium tetrapropylene sulfonate:

Wetting time (Draves) of 0.2% active ingredient in 3% NaOH=4.5 sec.
Wetting time (Draves) of 0.1% active ingredient in fertilizer ammoniating solution (East Point Plant)=8 sec.
Wetting time (Draves) of 0.1% active ingredient in 25% H₂SO₄=1.5 sec.

The data and results presented above show that both propylene trimer and propylene tetramer can be sulfonated with SO₃ in SO₂ in yields of 75–80% and 65–75%, respectively, when 0.125 mole of glacial acetic acid per mole of sulfur trioxide is used as catalyst.

Unsaturation determinations further show (Table II) that after sulfonation the unsaturation is largely retained (68.8 to 83.5%) thus indicating that carbyl sulfate formation is not the primary reaction. Furthermore, the presence of acetic acid catalyzes or promotes the reaction to a degree such that an increase of as much as 16.6% (runs 1 and 4, column G, Table III) of the monosulfonated product can be attributed to the presence of ⅛ mole of acetic acid per mole of SO₃.

Analytical results (column I, Tables III and VI) prove conclusively that, on the average, 1 mole of SO₃ is combined with 1 mole of olefin to form a stable unsaturated sulfonic acid.

The presence of hydroxy-sulfonate in the acetic-acid catalyzed sulfonations exceeds the amount present in those runs where acetic acid was absent, as shown by the following results extracted from Table II:

| Run No. | With Acetic Acid, Mole Percent Nonene Hydroxy-sulfonate | Run No. | Without Acetic Acid, Mole Percent Nonene Hydroxy-sulfonate |
|---|---|---|---|
| 1 | 3.9 | 4 | nil |
| 2 | 4.9 | 5 | 1.1 |
| 3 | 5.8 | 6 | 4.5 |

Since the mole ratio of $SO_3$ to olefin is constant in runs 1 and 4, 2 and 5, and 3 and 6, the increase in hydroxy-sulfonate in runs 1, 2 and 3 over that in 4, 5 and 6, respectively, must be attributed to the presence of acetic acid (see Formula II); whereas, in runs 5 and 6 the major portion of the hydroxy-sulfonate formed must be attributed to carbyl-sulfate type intermediates.

Doubling the ratio of $SO_3$ to olefin increases the total conversion of the olefin as stated above; for example, compare runs 1 and 3 where the increase amounted to about 12% (column G of Table III). At the same time the amount of residual unsaturation was reduced (Table II), but the amount of hydroxy-sulfonate increased only about 2% as shown above. These facts indicate that excess $SO_3$ in this case caused mainly a substitution reaction of tertiary or allylic hydrogen rather than carbyl sulfate formation, and the presence of up to 80+ mole percent of unsaturation in the sulfonated product together with the fact that glacial acetic acid aids in the formation of a small but detectable quantity of hydroxy-sulfonates support the theory illustrated by Formulae 9, 10 and 11.

From the above data, it can be concluded that the monosulfonated propylene polymers consist approximately of the following:

a. Monosulfonated olefin (with unsaturation retained) = 69–79%
b. Hydrocarbon hydroxy-sulfonates (saturated) = 4–6%
c. Sulfonate-sulfate hydrocarbon (saturated) = 17–25% $(100-(a+b))$ As pointed out above, the amount of acetic acid catalyst need not be restricted to 0.125 mole per mole of $SO_3$ as in the foregoing examples. The following table gives results obtained with increasing amounts of catalyst, other factors being the same.

TABLE VII

| Moles | | | Conversion of Olefin, wt. Percent | Mole Ratio, $SO_3$ to Combined Olefin |
|---|---|---|---|---|
| $SO_3$ | Olefin | Acetic Acid | | |
| 1 | 0.5 | 0 | 78.0 | 1.09 |
| 1 | 0.5 | 0.125 | 81.5 | 1.08 |
| 1 | 0.5 | 0.25 | 86.5 | 0.875 |
| 1 | 0.5 | 0.30 | 82.9 | 0.91 |
| 1 | 0.5 | 0.35 | 98.0 | 0.875 |
| 1 | 0.5 | 0.5 | 97.9 | 0.71 |

Note.—First two runs from Table III.

It is evident from the above results that increasing the amount of acetic acid up to about 0.5 mole per mole of $SO_3$ causes corresponding increases in the wt. percent of olefin converted to sulfonated product. As will be seen, the conversion is practically complete in the neighborhood of 0.5 mole acetic acid so that further increase in the amount of acetic acid is of no advantage.

On the other hand the above data indicate that such higher amounts of acetic acid cause some polymerization to take place. It will be observed that whereas the conversion of olefin increases as already stated, the mole ratio of $SO_3$ to combined olefin decreases at the same time. In other words, the amount of hydrocarbon attached to $SO_3$ is greater than in sulfonated nonene per se, and the amount of nonene consumed is also greater, indicating that higher amounts of acetic acid tend to cause to some extent the further polymerization of nonene along with simultaneous sulfonation.

The sulfonated propylene trimer and/or tetramer provide valuable surface active agents as indicated by the evaluations set forth above. They are especially valuable, in the form of their sodium salts, for use in alkaline solutions in which they exhibit extremely good surface activity. For example, the nonene sulfonate is very good in caustic solutions up to at least 30% to 50% concentration, and the tetramer sulfonate in, say, below 20% solutions. It will be understood that the same thing is true as to electrolyte solutions in general at similar concentrations.

It will be understood that the invention is not restricted to the details of the foregoing description and that reference should be had to the appended claims for a definition of its limits.

What is claimed is:

1. A process for the sulfonation of propylene trimer and propylene tetramer which comprises sulfonating said propylenic material with sulfur trioxide dissolved in liquid sulfur dioxide in the presence of a quantity of acetic acid catalyst within the approximate proportions of 0.125–0.5 mole of said acid per mole of sulfur trioxide.

2. A process as defined in claim 1, the amount of said sulfur trioxide being in the range of 1.0–2.0 moles per mole of said propylenic material.

3. Sulfonated propylenic material of the group consisting of sulfonated mono-olefinic propylene trimer and propylene tetramer averaging nine carbon atoms and twelve carbon atoms respectively and prepared by the process defined in claim 1, said sulfonated material containing about 69–79% monosulfonated olefin retaining its unsaturation, about 4–6% saturated hydroxy-sulfonate, and about 17–25% saturated sulfonate-sulfate.

References Cited in the file of this patent
UNITED STATES PATENTS

| | | |
|---|---|---|
| 2,195,581 | Ross | Apr. 2, 1940 |
| 2,413,199 | Taylor | Dec. 24, 1946 |
| 2,572,605 | Fincke | Oct. 23, 1951 |
| 2,600,415 | Mikeska | June 17, 1952 |